US009703418B2

(12) United States Patent
Shimazu et al.

(10) Patent No.: US 9,703,418 B2
(45) Date of Patent: Jul. 11, 2017

(54) MOBILE TERMINAL AND DISPLAY CONTROL METHOD

(71) Applicant: KYOCERA CORPORATION, Kyoto-shi, Kyoto (JP)

(72) Inventors: Tomohiro Shimazu, Osaka (JP); Kimiko Hirayama, Kumamoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/945,251

(22) Filed: Nov. 18, 2015

(65) Prior Publication Data

US 2016/0070412 A1    Mar. 10, 2016

Related U.S. Application Data

(63) Continuation of application No. PCT/JP2014/063170, filed on May 19, 2014.

(30) Foreign Application Priority Data

May 21, 2013    (JP) .................................. 2013-106890

(51) Int. Cl.
G06F 3/041 (2006.01)
G06F 3/0488 (2013.01)
(Continued)

(52) U.S. Cl.
CPC ............ *G06F 3/0416* (2013.01); *G06F 3/023* (2013.01); *G06F 3/048* (2013.01); *G06F 3/0412* (2013.01); *G06F 3/0488* (2013.01); *G06F 3/04886* (2013.01); *H04M 1/00* (2013.01); *H04M 1/72519* (2013.01); *H04W 88/02* (2013.01);
(Continued)

(58) Field of Classification Search
CPC . G06F 3/02; G06F 3/041; G06F 3/045; G06F 3/042; G09G 5/00; G01R 27/26; B41J 5/00
See application file for complete search history.

(56) References Cited

U.S. PATENT DOCUMENTS

2009/0160792 A1    6/2009 Morohoshi et al.
2009/0237361 A1*   9/2009 Mosby ................ G06F 3/04883
                                             345/173
(Continued)

FOREIGN PATENT DOCUMENTS

JP    2009-163278 A    7/2009
JP    2010-154090 A    7/2010
(Continued)

OTHER PUBLICATIONS

Written Opinion from International Application No. PCT/JP2014/063170, dated Jul. 29, 2014, in 5 pages.

*Primary Examiner* — Pegeman Karimi
(74) *Attorney, Agent, or Firm* — Duane Morris LLP

(57) ABSTRACT

A mobile phone comprises a display provided with a touch panel, and the like. When a telephone function is executed, a dial pad is displayed on the display. The dial pad can be freely changed in display position and size. For example, when a calling operation is performed and a screen is switched after a reference position for the display of the dial pad is changed to be included on the right side in the screen, an end key EK included in a screen during calling and a standard GUI included in a standard GUI display region are displayed on the right side.

6 Claims, 14 Drawing Sheets

(51) Int. Cl.
*G06F 3/023* (2006.01)
*G06F 3/048* (2013.01)
*H04M 1/00* (2006.01)
*H04M 1/725* (2006.01)
*H04W 88/02* (2009.01)
*H04M 1/23* (2006.01)

(52) U.S. Cl.
CPC ............ *G06F 2203/04104* (2013.01); *G06F 2203/04803* (2013.01); *G06F 2203/04808* (2013.01); *H04M 1/23* (2013.01); *H04M 1/7258* (2013.01); *H04M 2250/22* (2013.01)

(56) References Cited

U.S. PATENT DOCUMENTS

| | | | |
|---|---|---|---|
| 2011/0302520 A1 | 12/2011 | Yuasa et al. | |
| 2012/0188174 A1* | 7/2012 | Migos | G06F 3/04883 345/173 |
| 2013/0088439 A1* | 4/2013 | Shih | G06F 3/016 345/173 |
| 2014/0068492 A1* | 3/2014 | Yu | G06F 3/04886 715/773 |

FOREIGN PATENT DOCUMENTS

| | | |
|---|---|---|
| JP | 2011-124688 A | 6/2011 |
| JP | 2011-254358 A | 12/2011 |
| JP | 2012-142013 A | 7/2012 |

* cited by examiner

FIG.1
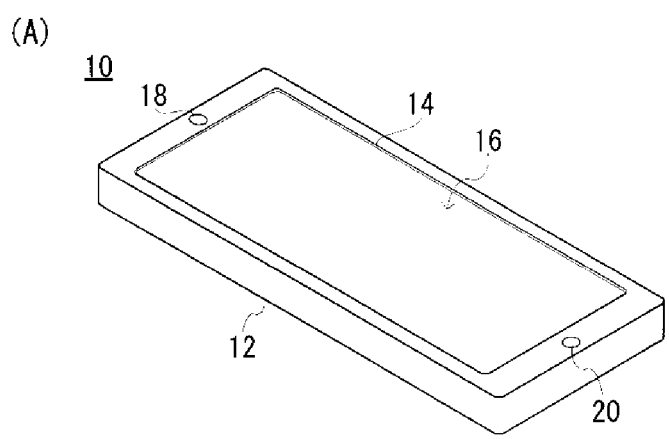
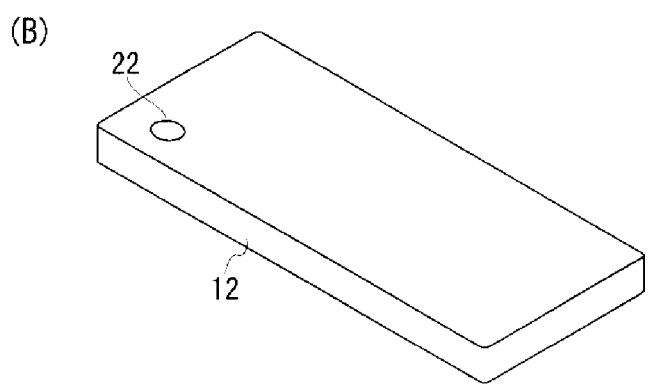

REFERENCE POSITION TABLE

| RIGHT REGION | ○ |
|---|---|
| LEFT REGION | |
| CENTERLINE | |

DISPLAY OBJECT TABLE

| DISPLAY OBJECT | LEFT | CENTER | RIGHT |
|---|---|---|---|
| STANDARD GUI | $(X_1, Y_1)$ | $(X_2, Y_2)$ | $(X_3, Y_3)$ |
| END KEY | $(X_4, Y_4)$ | $(X_5, Y_5)$ | $(X_6, Y_6)$ |
| SEARCH BAR | $(X_7, Y_7)$ | – | $(X_8, Y_8)$ |
| ⋮ | ⋮ | ⋮ | ⋮ |

MOBILE TERMINAL AND DISPLAY CONTROL METHOD

CROSS-REFERENCE TO RELATED APPLICATION

The present application is a continuation based on PCT Application No. PCT/JP2014/063170 filed on May 19, 2014, which claims the benefit of Japanese Application No. 2013-106890, filed on May 21, 2013. PCT Application No. PCT/JP2014/063170 is entitled "Portable Terminal and Display Control Method", and Japanese Application No. 2013-106890 is entitled "Mobile Terminal and Display Control Method". The content of which are incorporated by reference herein in their entirety.

FIELD

Embodiments of the present disclosure relate to a mobile terminal and a display control method, and more particularly relate to a mobile terminal having a display module and a display control method.

BACKGROUND

As an example of background art, mobile equipment in which touch sensors are provided on both side surfaces of a housing is known. When a user holds the housing with his/her left or right hand, a plurality of icons are arranged on a liquid crystal display in accordance with the holding hand.

Known as another example of background art is a mobile terminal in which sensors for hand/finger hold detection for detecting the position held with a hand/finger are on the left side surface, right side surface and rear surface, respectively, so that the state being held with the left or right hand can be detected. In this mobile terminal, a key display region is on a touch panel display, and the arrangement of the key display region is determined in accordance with the position held with the right or left hand.

SUMMARY

The present disclosure adopts the following configuration as an aspect. The reference characters in parentheses, supplementary explanation and the like indicate correspondence with embodiments which will be described in order to help understanding of the present disclosure, and are not intended to limit the present disclosure in any way.

An aspect of the present disclosure is a mobile terminal having a display module, including a display module configured to display a first text input region, a processor configured to change a display position of the first text input region in accordance with a user's operation, and a memory module configured to store position information indicating a changed display position of the first text input region, wherein the display module is configured to display a display object included in a region other than the first text input region based on the position information.

Another aspect of the present disclosure is a display control method including the steps of displaying a text input region (S3, S43), changing a display position of the text input region in accordance with a user's operation (S7, S47), storing position information indicating the changed display position of the text input region (S23, S25, S63, S65), and displaying a display object included in a region other than the text input region based on the position information (S85, S89, S93, S95, S99, S101).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is an outline view showing a mobile phone of an embodiment of the present disclosure, showing at (A) a main surface of the mobile phone, and at (B) the rear surface of the mobile phone.

DETAILED DESCRIPTION

Figure 2:
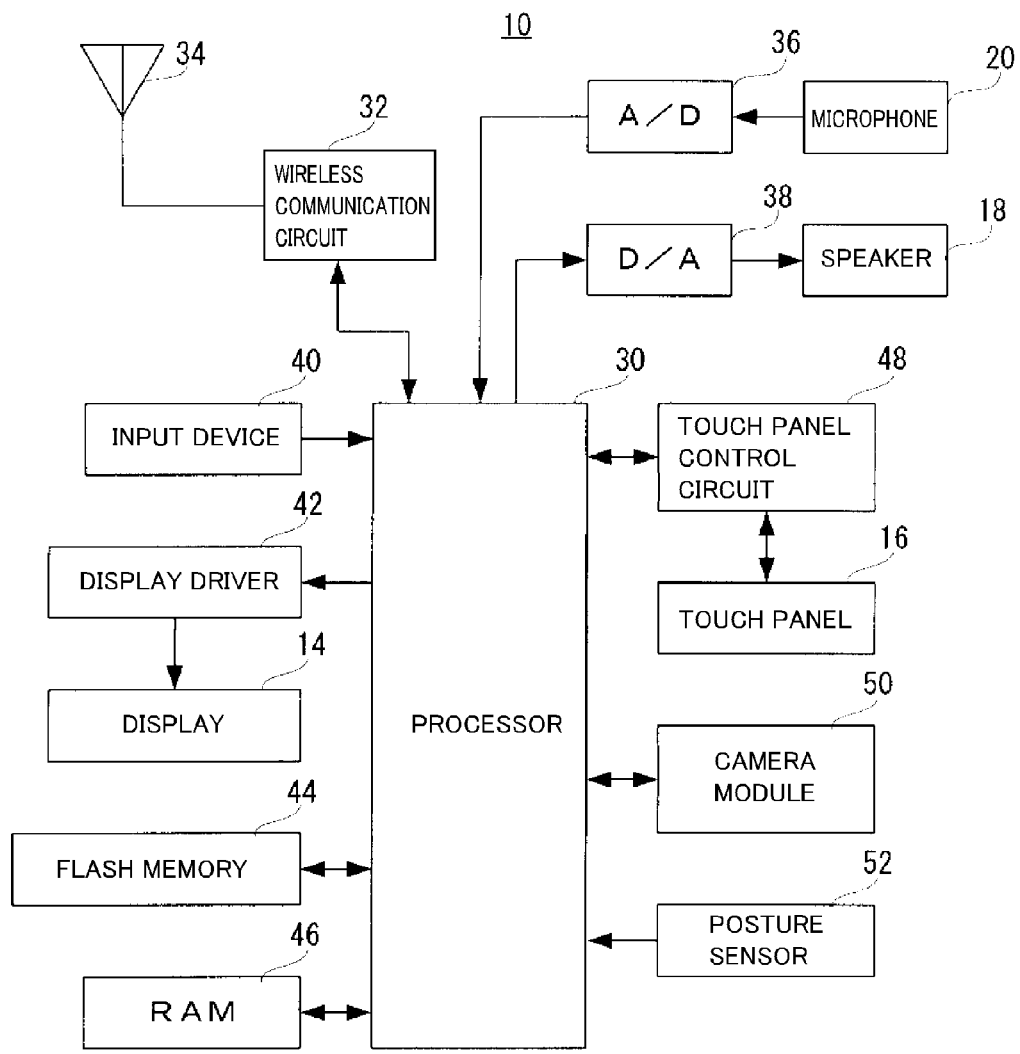
FIG. 2 is an illustration showing an electric configuration of the mobile phone shown in FIG. 1.

Referring to FIG. 1, a mobile phone 10 of an embodiment of the present disclosure is a smart phone as an example, and includes a vertically-long flat rectangular housing 12. It is pointed out in advance that the present disclosure is applicable to any mobile terminal, such as a tablet terminal or a PDA.

Provided on one main surface (front surface) of housing 12 is a crystalline liquid, organic electroluminescence or similar display 14 serving as a display module, for example. A touch panel 16 may be provided on display 14.

A speaker 18 is built in one end in the longitudinal direction of housing 12 on the main surface side, and a microphone 20 is built in the other end in the longitudinal direction on the main surface side.

In this embodiment, provided on a side surface of housing 12 is a power key as a hard key. Input operation means includes the hard key and touch panel 16.

Provided on the other surface (rear surface) of housing 12 is a lens opening 22 communicating with a camera module 50 (see FIG. 2).

For example, a user can input a telephone number by performing a touch operation on a dial pad DP (see FIG. 5) displayed on display 14, and can start a voice call by operating a call key. If an end key EK (see FIG. 6) displayed during calling (during voice transmission) or during talking is operated, a voice call can be terminated.

When a call is received (voice reception), a user is notified of the call reception by the display of display 14, vibration of a vibrator, a call receiving sound through speaker 18, or the like. A user can start a voice call when he/she operates the call key displayed on display 14 in such a call receiving state. By pressing the power key for a short period of time, a user can turn off the display of display 14, and can set a locked state for preventing a wrong operation. By pressing and holding the power key, a user can turn on/off the power of mobile phone 10.

When a camera function is executed, a preview image (a through image) corresponding to a field is displayed on display 14. A user can capture an image by performing an image capturing operation with the other surface on which lens opening 22 is provided facing any subject.

Mobile phone 10 has an e-mail function, a browser function and the like, in addition to the telephone function and the camera function. In the following description, GUIs, such as keys, icons displayed on display 14 and the like may be collectively referred to as a display object.

Referring to FIG. 2, mobile phone 10 of the embodiment shown in FIG. 1 includes a computer or a processor 30 called CPU, and the like. Connected to processor 30 are a wireless communication circuit 32, an A/D converter 36, a D/A converter 38, an input device 40, a display driver 42, a flash memory 44, a RAM 46, a touch panel control circuit 48, a camera module 50, a posture sensor 52, and the like.

Processor 30 can manage overall control of mobile phone 10. All or part of a program previously set in flash memory 44 is developed to RAM 46 in use, and processor 30 can operate in accordance with this program on RAM 46. RAM 46 is further used as a working area or buffer area of processor 30.

Input device 40 includes a power key (hard key). The power key can serve as an operation receiving module which receives a user's key operation on the power key. Information (key data) on the hard key operated by the user is input to processor 30.

Wireless communication circuit 32 is a circuit for sending/receiving electric waves for a voice call, e-mail, and the like through an antenna 34. In an embodiment, wireless communication circuit 32 may be a circuit for performing wireless communications in a CDMA system. For example, when a user operates touch panel 16 to instruct calling (voice transmission), wireless communication circuit 32 executes voice transmission processing under an instruction from processor 30 to output a voice transmission signal through antenna 34. The voice transmission signal is sent to a partner's telephone via a base station and a communication network. When voice reception processing is performed in the partner's telephone, a communication available state is established, and processor 30 can execute call processing.

Microphone 20 shown in FIG. 1 may be connected to A/D converter 36, and as described above, an audio signal from microphone 20 can be converted into digital audio data by this A/D converter 36 for input to processor 30. On the other hand, speaker 18 may be connected to D/A converter 38. D/A converter 38 can convert digital audio data into an audio signal for supply to speaker 18 through an amplifier. Voice based on the audio data is output through speaker 18. In the state where the call processing is being executed, voice collected by microphone 20 is sent to a partner's telephone, and voice collected by the partner's telephone is output through speaker 18.

In response to a volume adjustment operation made by a user, for example, processor 30 can adjust the volume of voice output through speaker 18 by controlling the amplification factor of the amplifier connected to D/A converter 38.

Display 14 shown in FIG. 1 may be connected to display driver 42, and display 14 can display video or an image in accordance with video or image data output from processor 30. Display driver 42 includes a video memory for temporarily storing image data to be displayed, and data output from processor 30 may be stored in this video memory. Display driver 42 can cause display 14 to display an image in accordance with the contents of the video memory. Display driver 42 can control the display of display 14 connected to display driver 42 under an instruction from processor 30. Display 14 may be provided with a back light, and display driver 42 can control the brightness and turn-on/off of the back light in accordance with an instruction from processor 30.

Touch panel 16 shown in FIG. 1 is connected to touch panel control circuit 48. Touch panel control circuit 48 can apply a required voltage and the like to touch panel 16, and can input to processor 30 a touch start signal indicating the start of a touch made by a user on touch panel 16, a termination signal indicating the termination of the touch made by the user, and coordinate data indicating a touch position the user has touched. Processor 30 can determine on which object the user has touched, based on this coordinate data.

In an embodiment, touch panel 16 may be a capacitance touch panel which detects changes in capacitance occurring between the surface thereof and an object, such as a finger. Touch panel 16 can detect that a finger or several fingers has/have touched touch panel 16, for example. Touch panel 16 is also called a pointing device. Touch panel control circuit 48 can detect a touch operation within a touch effective range of touch panel 16, and can output coordinate data indicating the position of the touch operation to processor 30. A user can perform a touch operation on the surface of touch panel 16, thereby inputting an operation position, an operation direction and the like to mobile phone 10.

The touch operation of this embodiment includes a tap operation, a long tap operation, a flick operation, a sliding operation, and the like.

The tap operation is an operation of contacting (touching) the surface of touch panel 16 with a finger, and then lifting (releasing) the finger from the surface of touch panel 16 after a short period of time. The long tap operation is an operation of continuously contacting the surface of touch panel 16 with a finger for a predetermined time or longer, and then lifting the finger from the surface of touch panel 16. The flick operation is an operation of contacting the surface of touch panel 16 with a finger, and flicking the finger in any direction at a predetermined speed or higher. The sliding operation is an operation of moving a finger in any direction with the finger kept in contact with the surface of touch panel 16, and then lifting the finger from the surface of touch panel 16.

The above-mentioned sliding operation also includes a so-called drag operation, which is a sliding operation of contacting a display object displayed on the surface of display 14 with a finger and then moving the display object. An operation of lifting a finger from the surface of touch panel 16 after a drag operation will be called a drop operation.

In the following description, a touch operation, a long tap operation, a flick operation, a sliding operation, a drag operation, and a drop operation may each be described with the word "operation" omitted therefrom. A touch operation may be performed not only with a user's finger but also with a stylus pen or the like.

Camera module 50 includes a control circuit, a lens, an image sensor, and the like. When an operation of executing the camera function is performed, processor 30 can activate the control circuit and the image sensor. When image data based on a signal output from the image sensor is input to processor 30, a preview image corresponding to a subject is displayed on display 14. When actual image capturing processing is executed in this state, the date and time when the image capturing operation was performed are obtained, and metadata corresponding to the image data is generated. This metadata may contain information such as a data name, an image capturing date, and the like. Processor 30 can associate the metadata with image data obtained by image capturing, and can store them as a single image file in flash memory 44. At this time, processor 30 can cause speaker 18 to output sound which notifies that actual image capturing processing is being executed.

Posture sensor 52 is used to detect the movement of mobile phone 10. For example, posture sensor 52 is a piezoelectric gyroscope, which detects an angular velocity of three axes (x, y, z), and outputs the detection result to processor 30. Processor 30 can detect the movement and inclination of mobile phone 10 based on the angular velocity of each axis detected by posture sensor 52. Processor 30 can control the display direction of display 14, and the like based on the detected movement.

Figure 3:
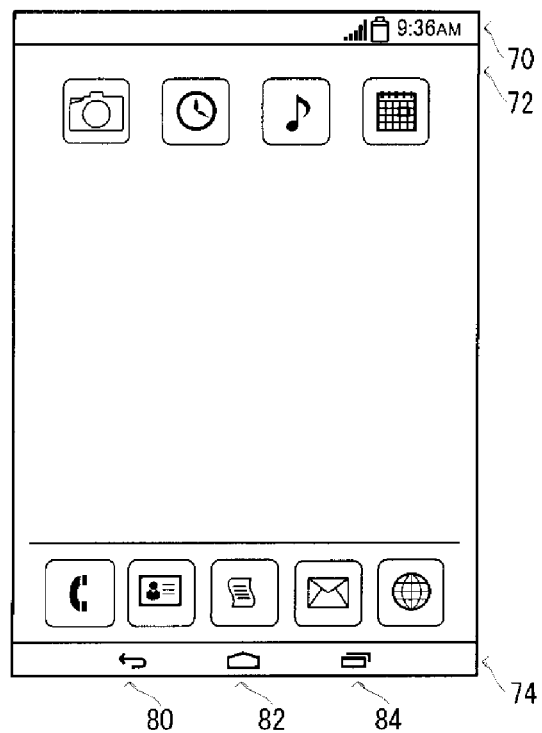
FIG. 3 is an illustration showing an example of a state where a home screen is displayed on a display shown in FIG. 1.

FIG. 3 is an illustration showing an example of a home screen displayed on display 14. The display range of display 14 includes a status display region 70, a function display region 72 and a standard GUI display region 74. In status display region 70, a pictogram indicating the status of radio wave reception by antenna 34, a pictogram indicating the remaining capacity of a secondary battery, and the time are displayed. In function display region 72, the home screen including a plurality of function icons is displayed. In standard GUI display region 74, a return key 80, a home key 82 and a menu key 84 which are standard GUIs may be displayed.

When a sliding operation (or a flick operation) in the horizontal direction is performed in the state where the home screen is displayed in function display region 72, the home screen to be displayed is switched. When the home screen is switched, the function icons included in the home screen are also switched accordingly. Five function icons displayed on the lower side on the home screen do not change, even if the home screen is switched.

The three keys displayed in standard GUI display region 74 are displayed on display 14 regardless of a function (application) to be executed or the like. Return key 80 is a key for displaying (returning to) an immediately preceding screen. Home key 82 is a key for displaying the home screen. Menu key 84 is a key for displaying a menu screen corresponding to a function being executed.

For example, when a user operates home key 82, the home screen is displayed on display 14. By performing a touch operation on a function icon displayed on display 14 in this state, the user can execute processing associated with that function icon.

Figure 4:
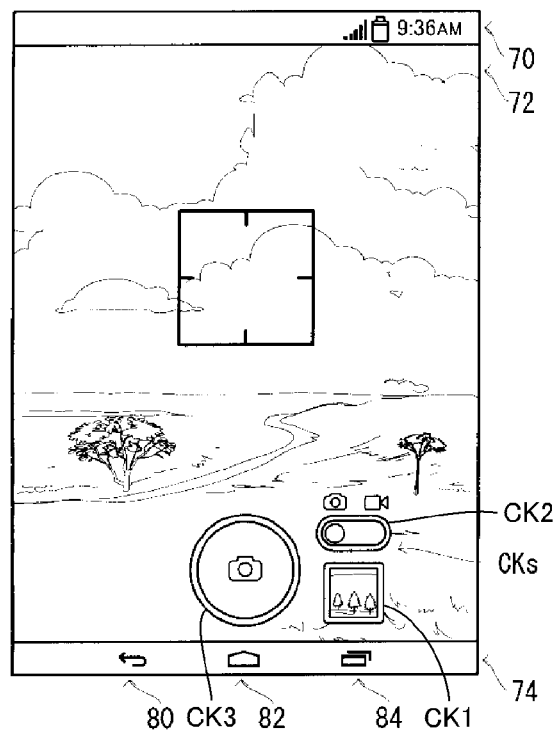
FIG. 4 is an illustration showing an example of a state where a preview screen is displayed on the display shown in FIG. 1.

FIG. 4 shows an example of a state where the camera function has been executed and a preview screen is displayed on function display region 72. For example, when a user operates a function icon corresponding to the camera function (camera icon), the camera function is executed. In the preview screen, a cursor indicating an image corresponding to a field and an AF focusing position are displayed, while a camera key group CKs may be displayed at the center on the lower side on the preview screen. Camera key group CKs includes a captured image icon CK1, a switch key CK2 and a shutter key CK3.

For example, when a touch operation is performed at any position on function display region 72 with the preview image being displayed, a cursor is displayed in correspondence with the touch position, and a subject included in the cursor is brought into focus. The captured image icon CK1 indicates images stored by capturing, and a touch thereon causes a transition to a screen displaying a list of captured images. The switch key CK2 is a key for switching between still picture capturing and moving picture capturing. The switch key CK2 is set by default to capture a still picture. The shutter key CK3 is a key for capturing a still picture or a moving picture. For example, when the shutter key CK3 is touched in the state where the switch key CK2 has been set to capture a still picture, actual image capturing processing is executed, and a still picture is stored in flash memory 44.

Figure 5:
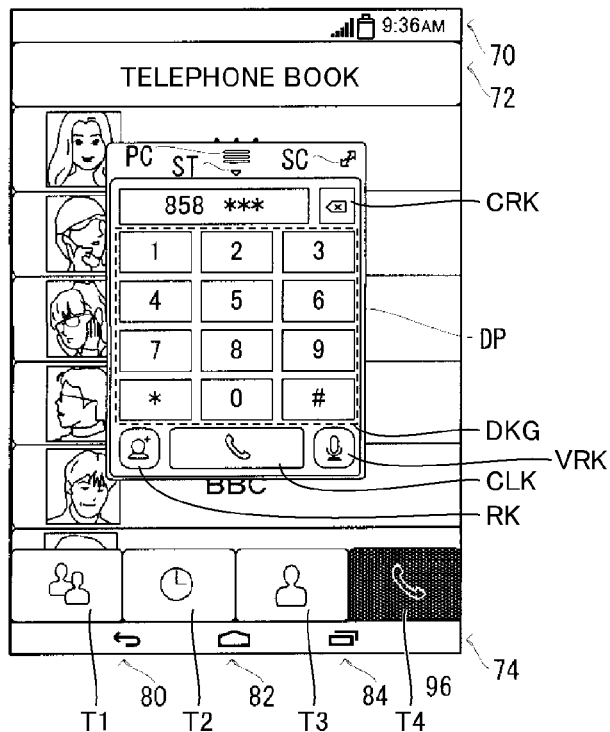
FIG. 5 is an illustration showing an example of a state where a telephone function screen including a dial pad is displayed on the display shown in FIG. 1.

FIG. 5 shows an example of a telephone function screen displayed when a function icon corresponding to the telephone function (telephone icon) is touched. On the telephone function screen, address data included in a telephone book and a plurality of tabs are displayed, and a dial pad DP for performing calling is displayed.

The address data contains names and telephone numbers registered by a user, and on the telephone function screen, a plurality of pieces of address data are displayed as a "telephone book." The plurality of tabs include a group switching tab T1 for switching the telephone book from the character order (the alphabetical order or the order of Japanese syllabary) to the order of groups set by a user, a history tab T2 for displaying calling/call reception histories, a telephone book tab T3 for displaying the telephone book, and a dial tab T4 for direct input of a telephone number to perform calling. In the state shown in FIG. 5, dial tab T4 has been selected, and the color of dial tab T4 has been reversed.

Dial pad DP includes a dial key group DKG for inputting a telephone number, a correction key CRK for correcting the input telephone number, a call key CLK for calling based on the input telephone number, a registration key RK for registering the input telephone number as address data, a voice recording key VRK for recording voice after calling, and the like. Dial pad DP has a position changing cursor PC for changing the display position of dial pad DP, a size changing cursor SC for changing the size of dial pad DP, and a reference position ST to be used as the reference for the display position of dial pad DP.

Figure 6:
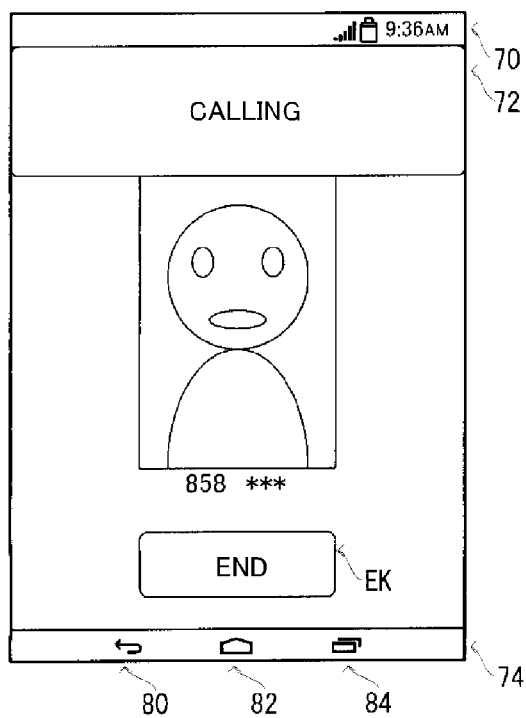
FIG. 6 is an illustration showing an example of a state where a screen during calling is displayed on the display shown in FIG. 1.

FIG. 6 is an illustration showing an example of a screen during voice calling. For example, when the call key is operated after a telephone number is input on dial pad DP, the screen during calling is displayed in function display region 72. On the screen during calling, a message and an image indicating that calling is being performed are displayed, while end key EK for interrupting calling is displayed at the center on the lower side on the screen during calling. By operating end key EK before a talking state with a partner is established, a user can interrupt voice transmission processing. When the voice transmission processing is interrupted, an immediately preceding screen, for example, the telephone function screen shown in FIG. 5 is displayed.

Figure 7:
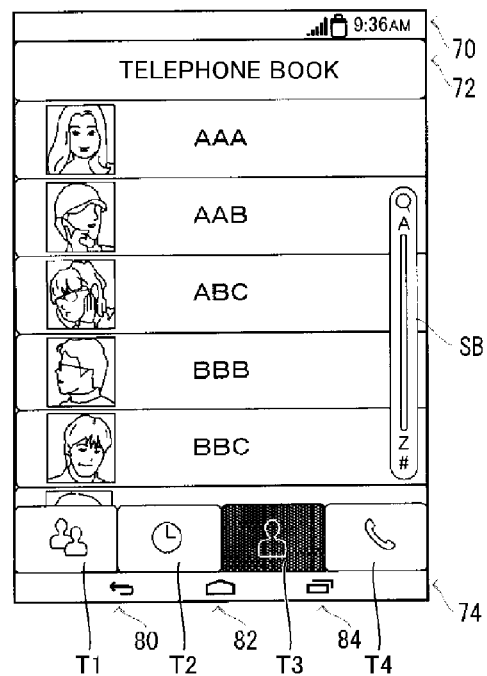
FIG. 7 is an illustration showing an example of a state where a telephone function screen including a search bar is displayed on the display shown in FIG. 1.

FIG. 7 shows an example of a screen when the telephone book tab T3 has been selected in the state where the telephone function screen is displayed. When the telephone book tab T3 is operated in the state where dial pad DP is displayed, for example, the display of dial pad DP disappears, and a plurality of pieces of address data are displayed in such a manner that a selection can be made therefrom. A search bar SB is displayed on the right side in function display region 72. For example, when a user touches search bar SB, address data is displayed based on a character (e.g., A, B, C . . . ) corresponding to the touch position. When a user slides search bar SB up/down with his/her finger, the character corresponding to the touch position changes, so that address data displayed also changes. A user can efficiently search the telephone book for necessary address data by utilizing search bar SB. A user can select any address data to thereby perform calling to a partner's telephone corresponding to the selected address data.

In the following description, GUIs displayed in function display region 72, such as camera key group CKs, end key EK and search bar SB, may be referred to as function GUIs.

Figures 8A, 8B:
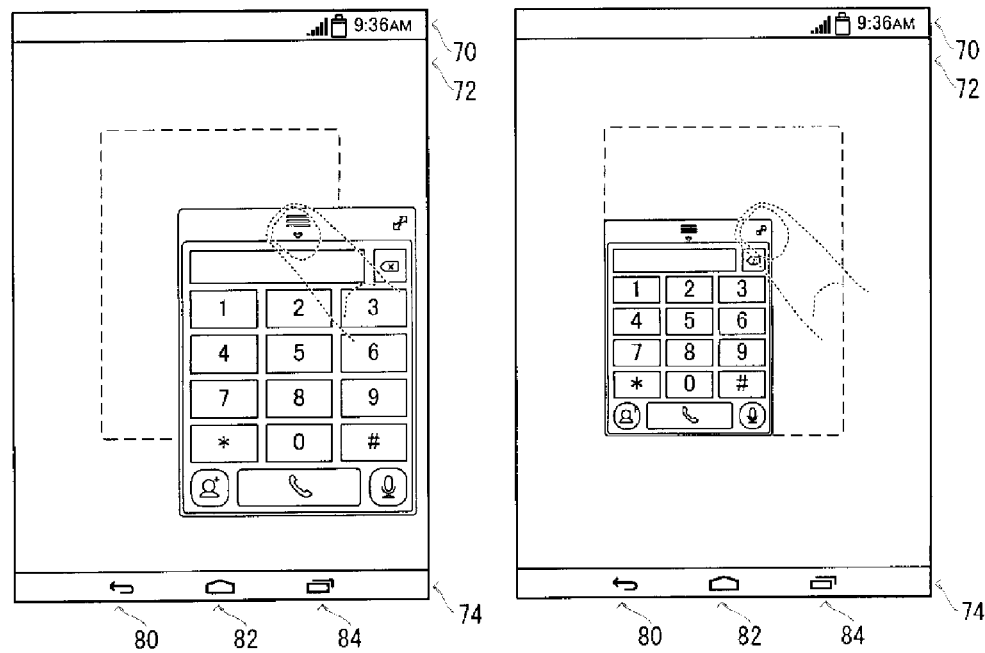
FIG. 8A is an illustration showing an example of an operation on the dial pad shown in FIG. 5, showing an example of an operation of changing the position of the dial pad.
FIG. 8B is an illustration showing an example of an operation on the dial pad shown in FIG. 5, showing an example of an operation of changing the size of the dial pad.

FIG. 8A and FIG. 8B are illustrations showing an example of an operation of changing the display state of dial pad DP. For example, when the size of display 14 is large, a user may feel it difficult to operate dial pad DP with one hand. At this time, for easy operation, a user may change the display state of dial pad DP.

Referring to FIG. 8A, when a user slides his/her finger to any position after a touch on position changing cursor PC, and then releases his/her finger, the display position of dial pad DP is changed. When sliding is performed along the diagonal line of dial pad DP after a touch on size changing cursor SC, the size of dial pad DP is changed based on the amount and direction of sliding. In another embodiment, the display position of dial pad DP may be changed by a drag operation on a region including position changing cursor PC, size changing cursor SC and reference position ST. In this embodiment, the size of dial pad DP shall be changed stepwise (e.g., in three stages) in accordance with the amount of movement, but may be adjusted to any size based on the amount and direction of sliding.

By displaying a display object at an appropriate position in accordance with a hand (the right or left hand) operating mobile phone 10, it becomes easy to operate mobile phone 10 with one hand.

In this embodiment, the hand (the right or left hand) with which a user is operating mobile phone 10 is determined based on reference position ST of dial pad DP, and the position where a display object is displayed is changed in accordance with the hand with which an operation is performed. Thus, increase in size and cost of mobile phone 10 is more restrained than when a dedicated sensor is used.

Figures 9, 10, 11:
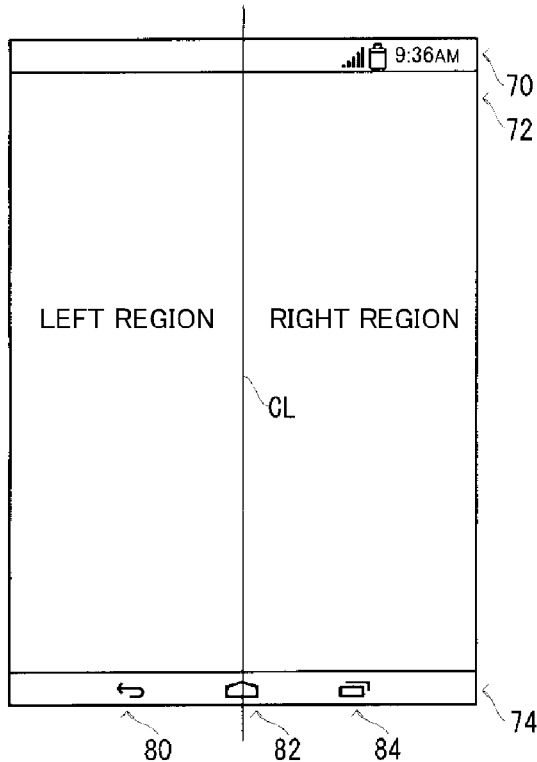
FIG. 9 is an illustration showing an example of a determination region on the display shown in FIG. 1.
FIG. 10 is an illustration showing an example of a structure of a reference position table stored in a RAM shown in FIG. 2.
FIG. 11 is an illustration showing an example of a structure of a display object table stored in the RAM shown in FIG. 2.

FIG. 9 is an illustration showing an example of a determination region for determining the position where dial pad DP is displayed. The determination region includes a left region, a right region and a centerline CL. The hand with which mobile phone 10 is operated is determined depending on in which region reference position ST of dial pad DP is included. If reference position ST is included in the right region, it is considered that mobile phone 10 is operated with the right hand. Then, a display object, such as standard GUIs and function GUIs, is displayed close to the right (on the right side). On the other hand, if reference position ST is included in the left region, it is considered that mobile phone 10 is operated with the left hand. Then, the display object, such as standard GUIs and function GUIs, is displayed close to the left (on the left side). If reference position ST is located on centerline CL, the display object is displayed at the center.

FIG. 10 is an illustration showing an example of a reference position table. The reference position table is a table showing the position of reference position ST in the determination region. For example, the reference position table shown in FIG. 10 indicates that reference position ST is included in the right region. The contents of the reference position table are updated when the screen on which dial pad DP is displayed is switched. When the display object is displayed, the position where the display object is displayed is determined with reference to the reference position table.

FIG. 11 is an illustration showing an example of a display object table. The display object table stores the position (coordinates) used as the reference when displaying the display object. The coordinates are stored in the right, center and left columns corresponding to standard GUIs and end key EK, while nothing is stored in the central column corresponding to search bar SB since displaying search bar SB at the center would obstruct display of address data. Standard GUIs, end key EK, and the like has been set to be displayed at the left, right or center, while search bar SB has been set not to be displayed at the center of function display region 72.

For example, when displaying end key EK on the left side, it is displayed using (X4, Y4) stored in the left column corresponding to end key EK as the reference. If the display object including search bar SB is displayed at the center, it is displayed using (X8, Y8), which is a position on the right side displayed in the default state, as the reference, since nothing is stored in the central column corresponding to search bar SB. In another embodiment, a default position (e.g., the right position) may be stored in the central column corresponding to a display object not to be displayed at the center. In another embodiment, a left position may be stored as the default position.

Figure 12A:
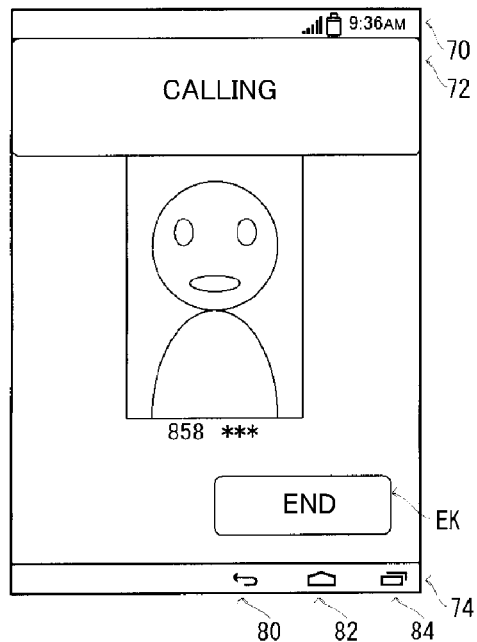
FIG. 12A is an illustration showing another example of a state where the screen during calling is displayed on the display shown in FIG. 1, showing an example of a state where a display object is displayed on the right side.
Figure 12B:
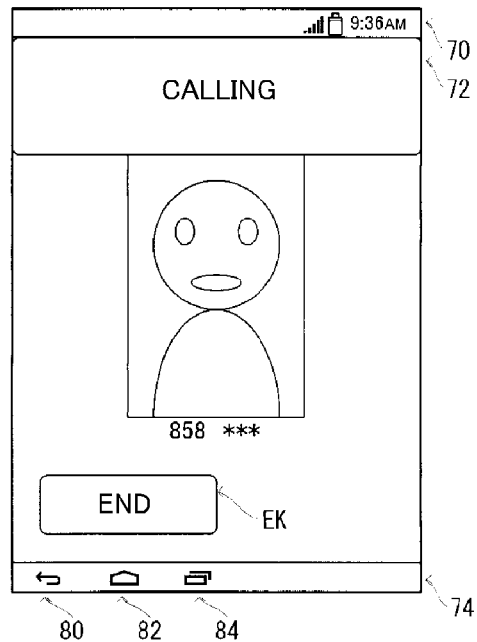
FIG. 12B is an illustration showing another example of a state where the screen during calling is displayed on the display shown in FIG. 1, showing an example of a state where the display object is displayed on the left side.

FIG. 12A and FIG. 12B each show an example of a state where the screen during calling is being displayed. For example, when a calling operation is performed after changing the position of dial pad DP and a screen is switched, then, the screen during calling shown in FIG. 12A or FIG. 12B may be displayed. FIG. 12A shows a state where a determination has been made that an operation is being performed with the right hand, and return key 80, home key 82 and menu key 84 are displayed on the right side in standard GUI display region 74, and end key EK is displayed on the right side in function display region 72. On the other hand, FIG. 12B shows a state where a determination has been made that an operation is being performed with the left hand, and return key 80, home key 82, menu key 84, and end key EK are displayed on the left side. In the case where the reference position table indicates that reference position ST is located on centerline CL, the screen during calling is the same as the state shown in FIG. 6, illustration of which is omitted here.

Figure 13A:
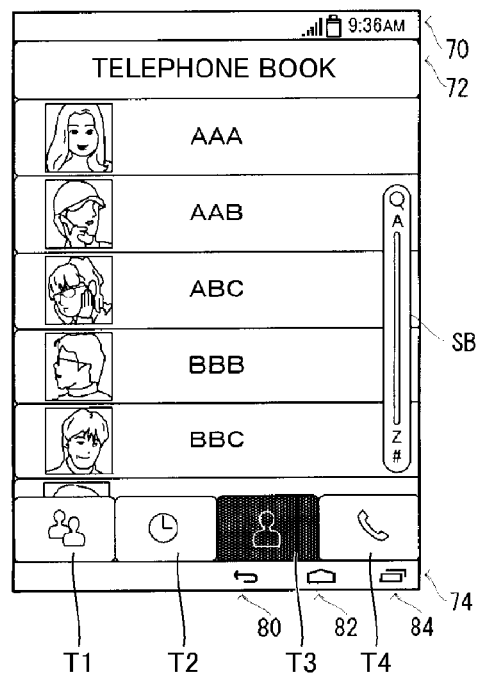
FIG. 13A is an illustration showing another example of a state where the telephone function screen including the search bar is displayed on the display shown in FIG. 1, showing an example of a state where a display object is displayed on the right side.
Figure 13B:
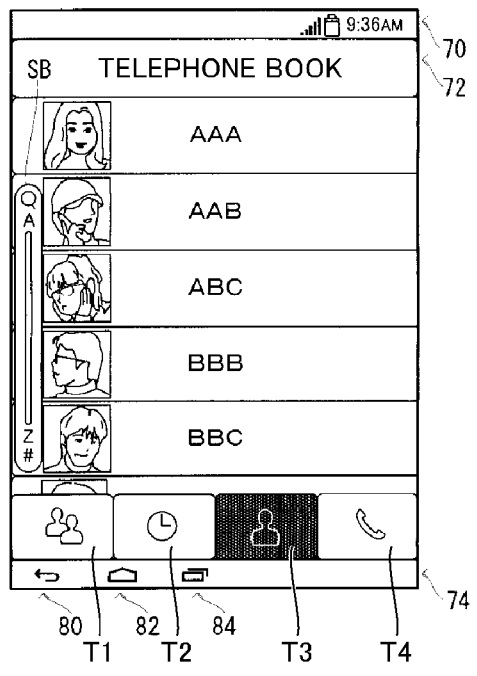
FIG. 13B is an illustration showing another example of a state where the telephone function screen including the search bar is displayed on the display shown in FIG. 1, showing an example of a state where the display object is displayed on the left side.

FIG. 13A and FIG. 13B each show an example of a state where the telephone book is displayed on the telephone function screen. For example, when the telephone book tab T3 is touched after changing the position of dial pad DP and a screen is switched, then, the telephone function screen shown in FIG. 13A or FIG. 13B may be displayed. FIG. 13A shows a state where a determination has been made that an operation is being performed with the right hand, and the three keys included in standard GUI display region 74 are displayed on the right side, and search bar SB is also displayed on the right side. FIG. 13B shows a state where a determination has been made that an operation is being performed with the left hand, and the three keys displayed in standard GUI display region 74 are displayed on the left side, and search bar SB is also displayed on the left side. In the case where the reference position table indicates that reference position ST is located on centerline CL, standard GUIs are displayed at the center, but search bar SB is displayed on the right side, not at the center.

Figure 14A:
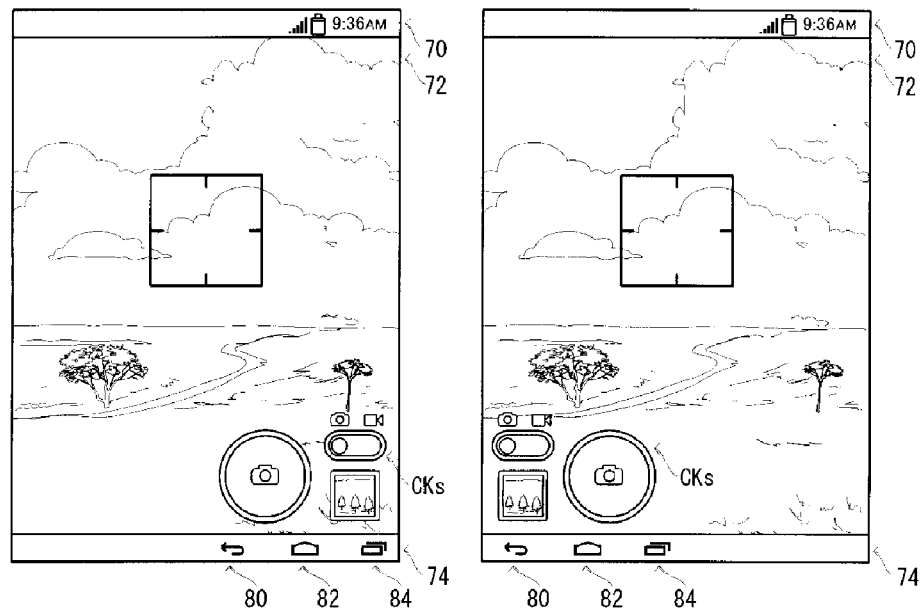
FIG. 14A is an illustration showing another example of a state where the preview screen is displayed on the display shown in FIG. 1, showing an example of a state where a display object is displayed on the right side.
Figure 14B:
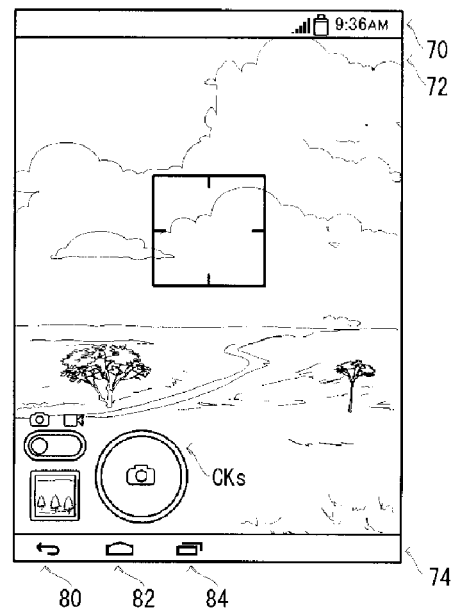
FIG. 14B is an illustration showing another example of a state where the preview screen is displayed on the display shown in FIG. 1, showing an example of a state where the display object is displayed on the left side.

FIG. 14A and FIG. 14B each show an example of a state where the preview screen is displayed. For example, when return to the home screen is made after changing the position of dial pad DP and a touch operation is performed on the camera icon, then, the preview screen shown in FIG. 14A or FIG. 14B is displayed. FIG. 14A shows a state where a determination has been made that an operation is being performed with the right hand, with standard GUIs and camera key group CKs being displayed on the right side. FIG. 14B shows a state where a determination has been made that an operation is being performed with the left hand, with standard GUIs and camera key group CKs being displayed on the left side.

By determining a user's hand with which text input is performed, the display object included in a display area other than dial pad DP can be displayed at an appropriate position.

For example, if display 14 of large size is provided with touch panel 16, it is difficult to perform a touch operation on the whole screen with one hand. In this embodiment, the display object is appropriately displayed in accordance with the hand with which an operation is performed, and therefore, even mobile phone 10 provided with display 14 of large size is easy to be held with one hand.

If nothing is stored in the central column of the display object table, which is the case where the display object cannot be displayed at the center, the display object is displayed at the default position considered to be easy for a user to operate.

By restraining the display of the display object from being changed until the display is switched, the processing load on processor 30 can be reduced. For example, even in the case where the position of the display object is set to be also changed every time a user changes the display position of dial pad DP (reference position ST), it is not necessary for processor 30 to execute processing of updating the display of the display object every time the display position of dial pad DP is changed. By changing the display of the display object after the screen is switched as in an embodiment. As a result, the load on processor 30 can be reduced. Even if reference position ST of dial pad DP changes frequently on the borderline between the left and right regions, the display of the display object will be stabilized by changing the display of the display object after the screen is switched as in an embodiment. As a result, it will be easy for a user to see the screen. In an embodiment, the display of the display object may be set to be also changed every time the operation of changing the display state of dial pad DP is terminated.

It becomes easy for a user to recognize the reference when dial pad DP is displayed because of reference position ST of dial pad DP.

In an embodiment, the display of the display object may be changed based on the display position of not only dial pad DP but also virtual keyboard KB in the QWERTY arrangement.

Figure 15:
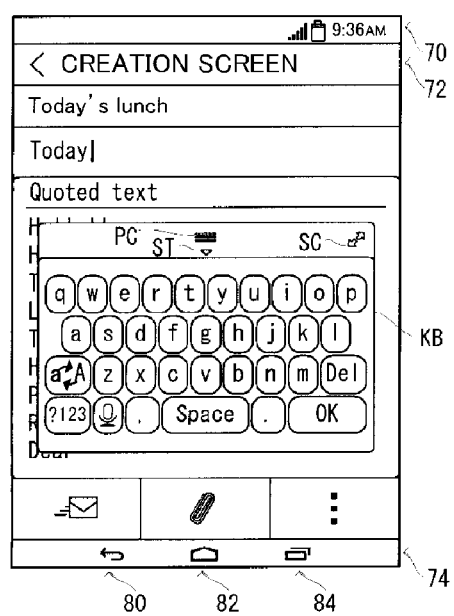
FIG. 15 is an illustration showing an example of a state where a virtual keyboard is displayed on the display shown in FIG. 1.

FIG. 15 is an illustration showing an example of a state where virtual keyboard KB is displayed. For example, when an operation of touching a function icon for executing an e-mail function (e-mail icon) and creating a new e-mail message is performed, virtual keyboard KB is displayed at the center of function display region 72. Virtual keyboard KB has position changing cursor PC, size changing cursor SC and reference position ST, similarly to dial pad DP. A user can change the position where the display object is displayed by changing the display position (reference position ST) of virtual keyboard KB. The result of one of dial pad DP and virtual keyboard KB for which reference position ST has been changed most recently is reflected in the contents of the reference position table.

When transmission of an e-mail message or the display of an e-mail menu is performed, the display object is displayed based on reference position ST of virtual keyboard KB. For example, if reference position ST of virtual keyboard KB is included in the right region, the display object is displayed on the right side, and if reference position ST of virtual keyboard KB is included in the left region, the display object is displayed on the left side. In the following description, in the case where dial pad DP and virtual keyboard KB are not distinguished, they may be referred to as a text input region.

Figure 16A:
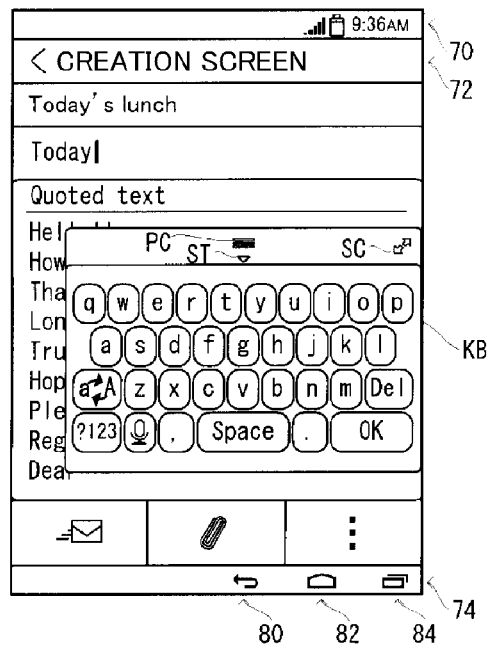
FIG. 16A is an illustration showing another example of a state where the virtual keyboard is displayed on the display shown in FIG. 1, showing an example of a state where the virtual keyboard is displayed on the right side.
Figure 16B:
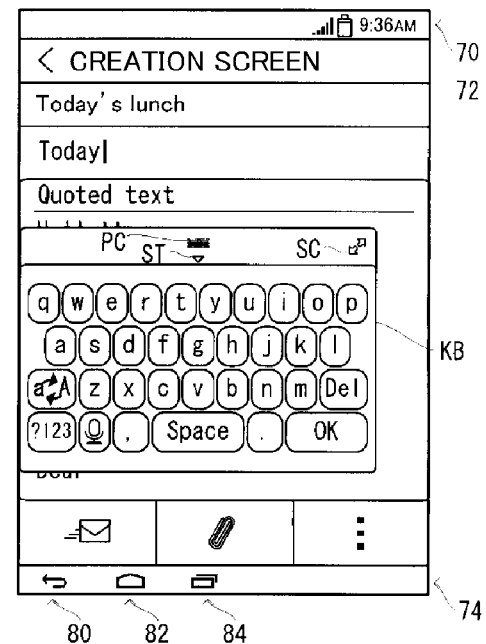
FIG. 16B is an illustration showing another example of a state where the virtual keyboard is displayed on the display shown in FIG. 1, showing an example of a state where the virtual keyboard is displayed on the left side.

The display position of virtual keyboard KB and that of dial pad DP may be associated with each other. For example, referring to FIG. 16A, when virtual keyboard KB is displayed with reference position ST of dial pad DP included in the right region, reference position ST of virtual keyboard KB is set to be also included in the right region. Referring to FIG. 16B, when virtual keyboard KB is displayed with reference position ST of dial pad DP included in the left region, reference position ST of virtual keyboard KB is set to be also included in the left region. When the display position of virtual keyboard KB is changed, the result of change is also reflected in the display position of dial pad DP.

In this way, by associating the display positions of the two text input regions, convenience when inputting text can be improved.

Although the above description has been made on the case where the display direction of display 14 is the longitudinal direction, the display of the display object may be changed based on the display position (reference position ST) of a text input region even if the display direction is the horizontal direction.

Figure 17:
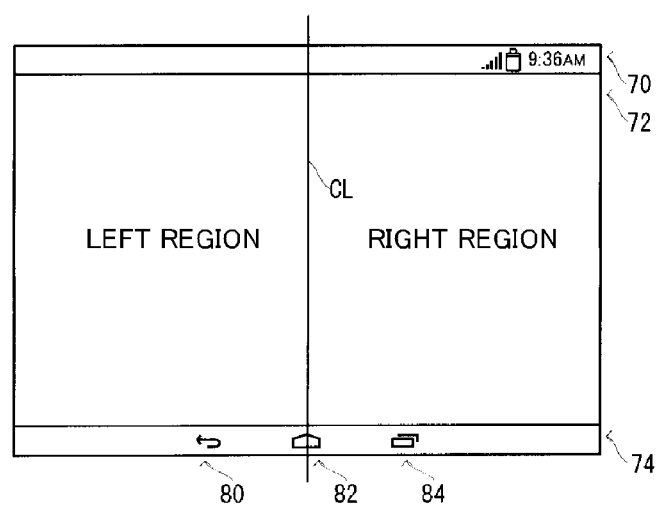
FIG. 17 is an illustration showing another example of the determination region on the display shown in FIG. 1.
Figure 18A:
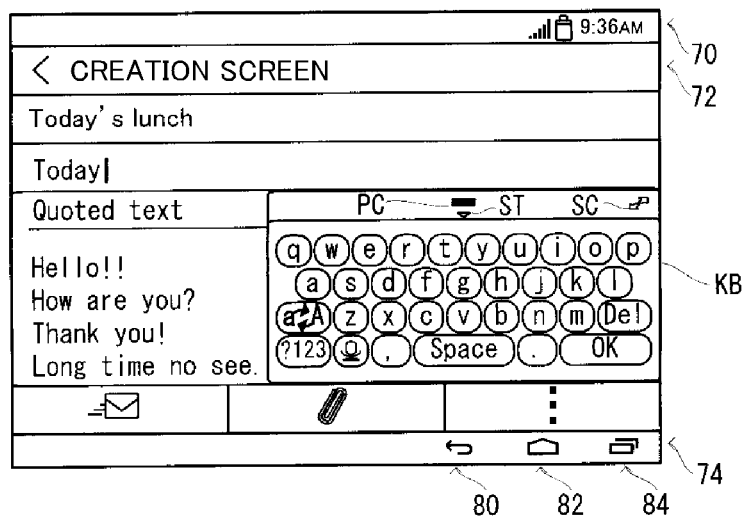
FIG. 18A is an illustration showing another example of a state where the virtual keyboard is displayed on the display shown in FIG. 1, showing another example of a state where the virtual keyboard is displayed on the right side.
Figure 18B:
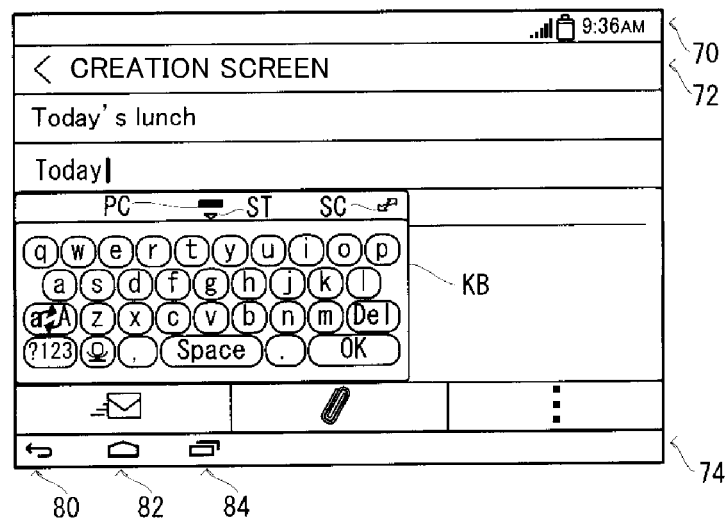
FIG. 18B is an illustration showing another example of a state where the virtual keyboard is displayed on the display shown in FIG. 1, showing another example of a state where the virtual keyboard is displayed on the left side.

Referring to FIG. 17, even when the display direction of display 14 is the horizontal direction, a determination region includes a left region, a right region and centerline CL, similarly to the case of the longitudinal direction. For example, if reference position ST of dial pad DP is included in the right region, the display object is displayed on the right side as shown in FIG. 18A. Virtual keyboard KB is also displayed such that reference position ST thereof is included in the right region. On the other hand, when reference position ST of dial pad DP is included in the left region, the display object is displayed on the left side as shown in FIG. 18B. Virtual keyboard KB is also displayed such that reference position ST is included in the left region. Although not shown, the display object and virtual keyboard KB are displayed at the center, if reference position ST of dial pad DP is located on centerline CL.

Virtual keyboard KB is displayed in various screens, such as, not only the creation screen of a new e-mail message, but also an edit screen for memo pad, a new registration/edit screen for schedule, and registration/edit screen for address data.

Since reference position ST and size of dial pad DP and virtual keyboard KB are stored in RAM 46, they are displayed at the same display position and in the same size next time they are displayed.

The features of this embodiment have been described above. Hereinafter, detailed descriptions will be given using the memory map shown in FIG. 19 and the flowcharts shown in FIGS. 20 to 22.

Figure 19:
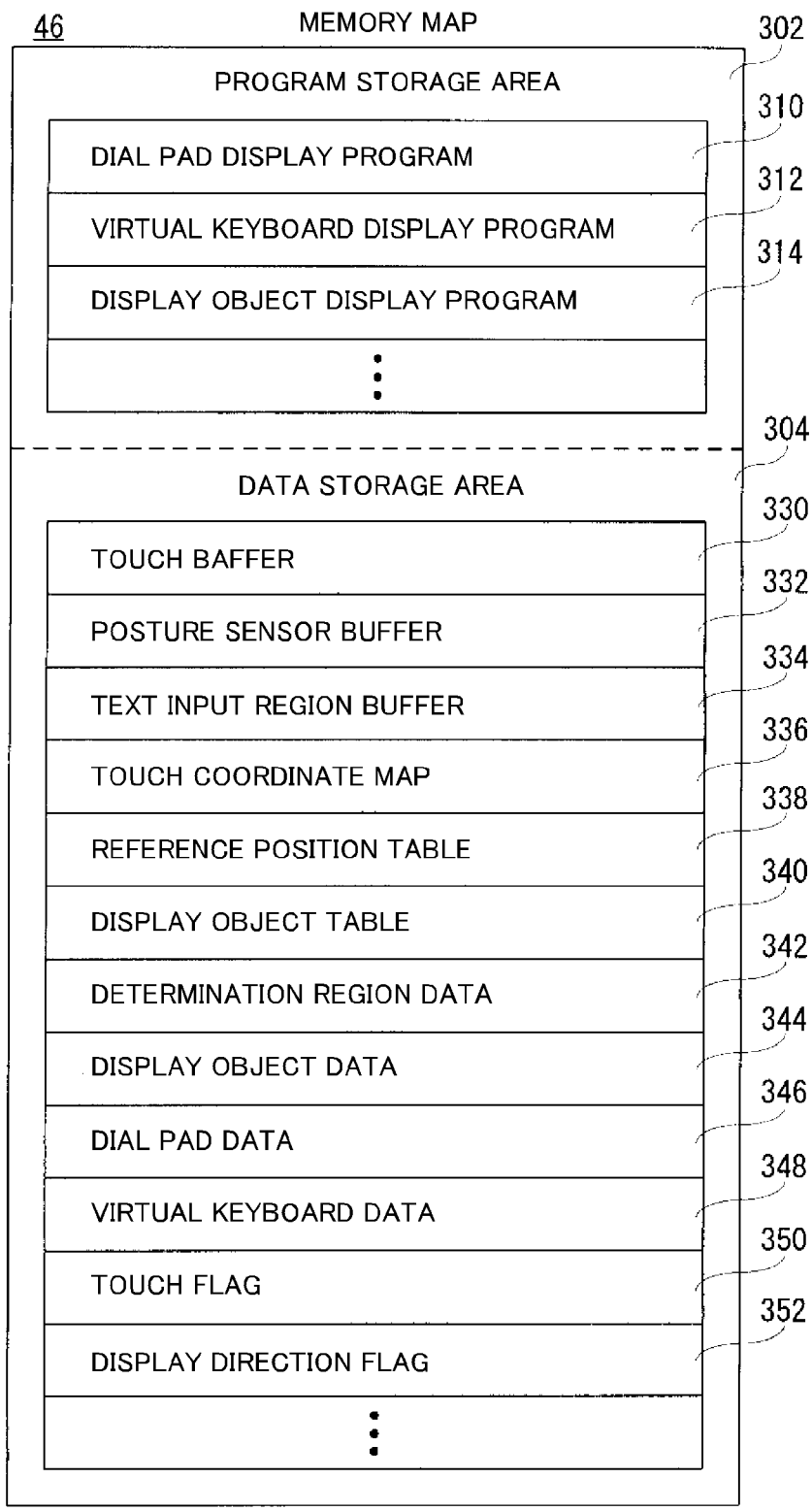
FIG. 19 is an illustration showing an example of a memory map in the RAM shown in FIG. 2.

Referring to FIG. 19, a program storage area 302 and a data storage area 304 are formed in RAM 46. Program storage area 302 is an area where some or all pieces of program data previously set in flash memory 44 (FIG. 2) are read and stored (developed), as described earlier.

Program storage area 302 stores a dial pad display program 310 for displaying dial pad DP to change its display position and size, a virtual keyboard display program 312 for displaying virtual keyboard KB to change its display position and size, a display object display program 314 for displaying a display object, such as standard GUIs and function GUIs, and the like.

Program storage area 302 also stores programs for executing the camera function, the e-mail function, and the like.

Data storage area 304 of RAM 46 is provided with a touch buffer 330, a posture sensor buffer 332, and a text input region buffer 334, and stores a touch coordinate map 336, a reference position table 338, a display object table 340, a determination region data 342, a display object data 344, a dial pad data 346, a virtual keyboard data 348, and the like. Data storage area 304 is also provided with a touch flag 350, a display direction flag 352, and the like.

Touch buffer 330 stores data of touch coordinates output from touch panel control circuit 48. Posture sensor buffer 332 temporarily stores information on the angular velocity output from posture sensor 52. Text input region buffer 334 temporarily stores reference position ST and size of a text input region having been changed. When reference position ST and size of dial pad DP or virtual keyboard KB are changed, the result is stored temporarily.

Touch coordinate map 336 is data for associating the touch coordinates in a touch operation with the display coordinates on display 14. The result of a touch operation performed on touch panel 16 is reflected in the display of display 14 based on touch coordinate map 336.

Reference position table 338 is a table of the structure as shown in FIG. 10, for example, and stores information indicating the position of reference position ST of the text input region. Display object table 340 is a table of the structure as shown in FIG. 11, for example, and stores the position (coordinates) used as the reference when displaying the display object.

Determination region data 342 is data containing the coordinates of the right region, the left region and centerline CL which are determination regions corresponding to the longitudinal direction or the horizontal direction. Display object data 344 is data containing images and character strings for displaying standard GUIs, function GUIs and the like. Dial pad data 346 is data for displaying dial pad DP, and contains information indicating images, characters, reference position ST, and size of dial pad DP. Virtual keyboard data 348 is data for displaying virtual keyboard KB, and contains information indicating images, characters, reference position ST, and size of virtual keyboard KB.

Touch flag 350 is a flag for determining whether or not touch panel 16 has been touched. For example, touch flag 350 is implemented by a 1-bit register. When touch flag 350 is turned on (established), a data value "1" is set in the register. On the other hand, touch flag 350 is turned off (not established), a data value "0" is set in the register. On/off of touch flag 350 is switched based on the output of touch panel control circuit 48.

Display direction flag 352 is a flag for determining whether the display direction of display 14 is the longitudinal direction or the horizontal direction. For example, on/off of display direction flag 352 is switched based on the output of posture sensor 52. If display direction flag 352 is on, the display direction is the longitudinal direction, and if display direction flag 352 is off, the display direction is the horizontal direction.

Data storage area 304 stores other data necessary for execution of a control program of mobile phone 10, and is provided with another flag and a timer (counter) necessary for execution of the control program.

Figure 20:
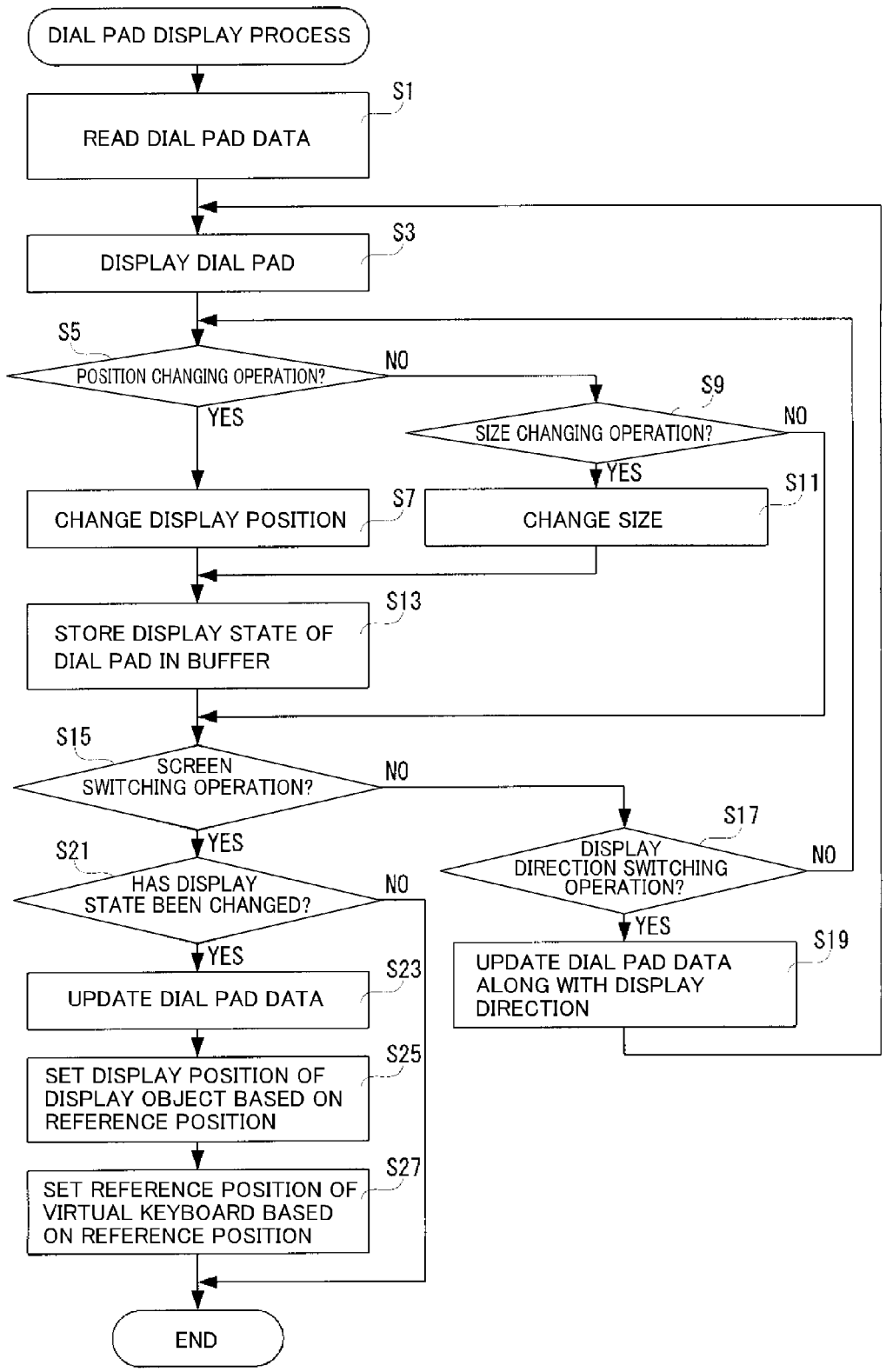
FIG. 20 is a flowchart showing an example of a dial pad display process executed by a processor shown in FIG. 2.
Figure 21:
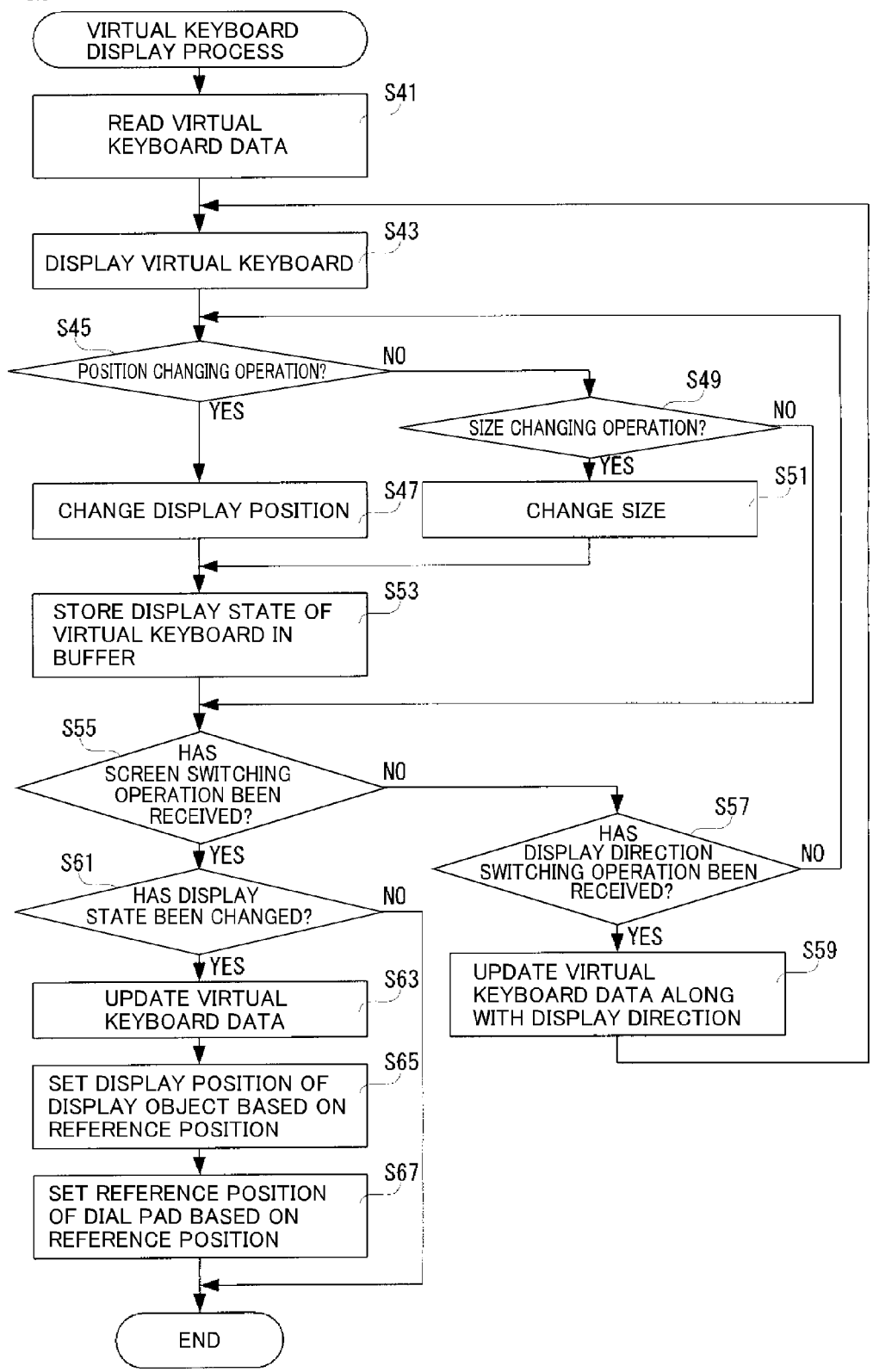
FIG. 21 is a flowchart showing an example of a virtual keyboard display process executed by the processor shown in FIG. 2.
Figure 22:
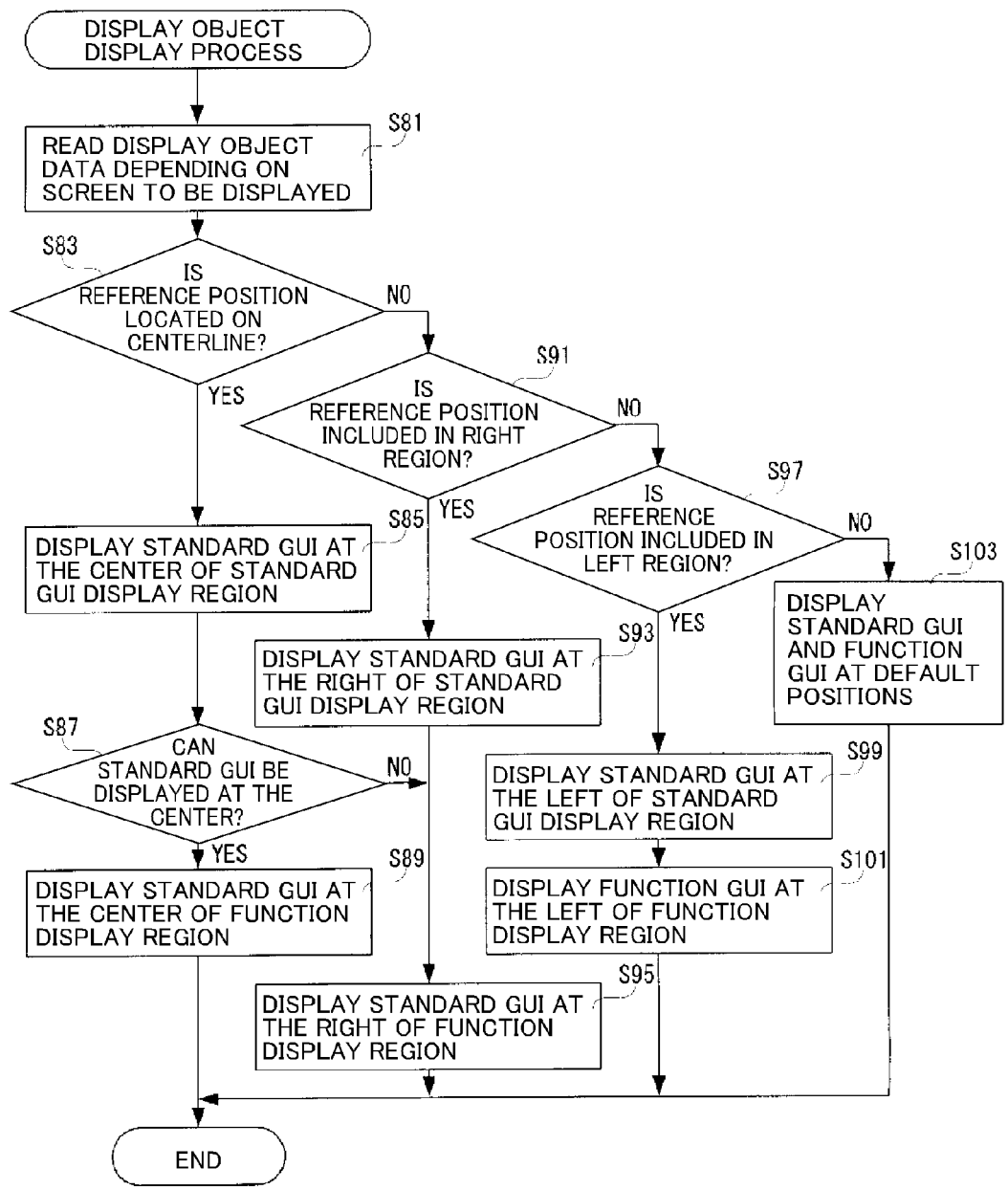
FIG. 22 is a flowchart showing an example of a display object display process executed by the processor shown in FIG. 2.

Processor 30 can process a plurality of tasks including a dial pad display process shown in FIG. 20, a virtual keyboard display process shown in FIG. 21, a display object display process shown in FIG. 22, and the like in parallel with each other under controls by Linux (registered trademark)-base OS such as Android (registered trademark) and REX or other OSs.

The dial pad display process is started when the telephone function is executed, for example. In step S1, processor 30 can read dial pad data 346. In order to display dial pad DP, dial pad data 346 is read from RAM 46. Then, in step S3, processor 30 can display dial pad DP. Based on the coordinates, size, images, and character strings of reference position ST contained in dial pad data 346, dial pad DP is displayed in function display region 72.

Then, in step S5, processor 30 can determine whether or not it is a position changing operation. It is determined whether a touch operation has been performed on position changing cursor PC. If it is "YES" in step S5, it means that a position changing operation has been performed, and processor 30 can change the display position in step S7, and advance the process to processing of step S13. For example, as shown in FIG. 8A, the display position (reference position ST) of dial pad DP is changed.

If it is "NO" in step S5, it means that a position changing operation has not been performed, and processor 30 can determine whether or not it is a size changing operation in step S9. It is determined whether a touch operation has been performed on size changing cursor SC. If it is "NO" in step S9, it means that a size changing operation has not been performed, and processor 30 can advance the process to processing of step S15. If it is "YES" in step S9, it means that a size changing operation has been performed, and processor 30 can change the size in step S11. For example, as shown in FIG. 8B, the size of dial pad DP is changed based on the amount and direction of sliding.

Then, in step S13, processor 30 can store the display state of dial pad DP in the buffer. For example, if the size of dial pad DP has been changed, information indicating reference position ST and size is temporarily stored in text input region buffer 334.

Then, in step S15, processor 30 can determine whether or not it is a screen switching operation. For example, it is determined whether a calling operation has been performed. The screen switching operation also includes an operation on home key 82 performed to terminate the telephone function, and the like. If it is "NO" in step S15, it means that a screen switching operation has not been performed, and processor 30 can determine whether or not it is a display direction switching operation in step S17. Based on the output of posture sensor 52 temporarily stored in posture sensor buffer 332, it is determined whether an operation of switching the posture of mobile phone 10 from the longitudinal direction to the horizontal direction or from the horizontal direction to the longitudinal direction has been performed.

If it is "NO" in step S17, it means that a display direction switching operation has not been performed, and processor 30 can return the process to the processing of step S5. On the other hand, if it is "YES" in step S17, when mobile phone 10 is inclined from the longitudinal direction to the horizontal direction, for example, processor 30 can update dial pad data 346 in accordance with the display direction in step S19. For example, the display position, size and the like are updated such that dial pad DP can be displayed in the horizontal direction. When the processing of step S19 is terminated, processor 30 can return the process to the processing of step S3.

If it is "YES" in step S15, it means that a screen switching operation of operating the call key or the like has been performed, and processor 30 can determine whether or not the display state has been updated in step S21. Processor 30 can determine whether reference position ST or size of dial pad DP has been changed. Specifically, it is determined whether information on reference position ST and size temporarily stored in text input region buffer 334 and information on reference position ST and size contained in dial pad data 346 are in agreement. If it is "NO" in step S21, it means that the display state of dial pad DP has not been changed, and processor 30 can terminate the dial pad display process.

On the other hand, if it is "YES" in step S21, it means that the display state of dial pad DP has been changed, and processor 30 can update dial pad data 346 in step S23. Reference position ST and size having been changed are reflected in dial pad data 346.

Then, processor 30 can set the display position of the display object based on reference position ST in step S25. It is determined at which position in the determination region reference position ST of dial pad DP is included, and the determination result is stored in reference position table 338.

Then, in step S27, processor 30 can set reference position ST of virtual keyboard KB based on reference position ST. For example, if reference position ST of dial pad DP is included in the right region, reference position ST of virtual keyboard data 348 is set such that virtual keyboard KB is displayed on the right side.

When the processing of step S27 is terminated, processor 30 can terminate the dial pad display process.

FIG. 21 is a flowchart of a virtual keyboard display process. This process is substantially identical to the dial pad display process, and a detailed description thereof will be omitted here.

For example, when an operation of creating a new e-mail message is performed and a transition is made to a state in which text can be input and edited, the virtual keyboard display process is started. Processor 30 can read virtual keyboard data 348 in step S41, and can display virtual keyboard KB in step S43. When virtual keyboard data 348 has been set in the dial pad display process, virtual keyboard KB is displayed based on the result having been set.

Then, in step S45, processor 30 can determine whether or not it is a position changing operation. If it is "YES" in step S45, it means that a touch operation has been performed on position changing cursor PC of virtual keyboard KB, and processor 30 can change the display position in step S47, and advance the process to processing of step S53. On the other hand, if it is "NO" in step S45, it means that a position changing operation has not been performed, and processor 30 can determine whether or not a size changing operation has been performed in step S49. If it is "NO" in step S49, it means that a size changing operation has not been performed, and processor 30 can advance the process to processing of step S55. If it is "YES" in step S49, it means that a touch operation has been performed on size changing cursor SC of virtual keyboard KB, and processor 30 can change the size in step S51. Then, in step S53, processor 30 can store the display state of virtual keyboard KB in the buffer. Reference position ST and size of virtual keyboard KB having been changed are stored in text input region buffer 334.

Then, in step S55, processor 30 can determine whether or not a screen switching operation has been received. If it is "NO" in step S55, it means that a screen switching operation has not been received, and in step S57 processor 30 can determine whether or not a display direction switching operation has been received. If it is "NO" in step S57, and if the inclination of mobile phone 10 has not been changed, for example, processor 30 can return the process to the processing of step S45. On the other hand, if it is "YES" in step S57, when mobile phone 10 is inclined in the horizontal direction, for example, processor 30 can update virtual keyboard data 348 in accordance with the display direction in step S59, and can return the process to the processing of step S43.

If it is "YES" in step S55, when an e-mail message sending operation is performed, for example, processor 30 can determine whether or not the display state has been updated in step S61. If it is "NO" in step S61, it means that the display state of virtual keyboard KB has not been changed, and processor 30 can terminate the virtual keyboard display process.

If it is "YES" in step S61, it means that the display state of virtual keyboard KB has not been changed, and processor 30 can update virtual keyboard data 348 in step S63. Information on reference position ST and size of virtual keyboard KB temporarily stored in text input region buffer 334 is reflected in virtual keyboard data 348. In step S65, processor 30 can set the display position of the display object based on reference position ST. Reference position table 338 is set based on reference position ST and determination region data 342. Then, in step S67, processor 30 can set reference position ST of dial pad DP based on reference position ST. For example, if reference position ST of virtual keyboard KB is included in the left region, dial pad data 346 is set such that reference position ST of dial pad DP is included in the left region.

When the processing of step S67 is terminated, processor 30 can terminate the virtual keyboard display process.

Processor 30 executing the processing of step S3 or step S43 can function as a first text input region display module or a second text input region display module.

FIG. 22 is a flowchart of a display object display process. For example, when the telephone book tab is operated on the telephone function screen, the display object display process is started. In step S81, processor 30 can read display object data 344 in accordance with the screen to be displayed. For example, display object data 344 is read, and images and character string information on standard GUIs and search bar SB are obtained from the data.

Then, in step S83, processor 30 can determine whether or not reference position ST is located on centerline CL. If it is "YES" in step S83, it means that reference position ST is located on centerline CL, and processor 30 can display standard GUIs at the center of standard GUI display region 74 in step S85. Based on display object table 340, return key 80, home key 82 and menu key 84 are displayed at the center of standard GUI display region 74. Then, in step S87, processor 30 can determine whether or not function GUIs can be displayed at the center. For example, it is determined whether coordinates have been stored in the central column of search bar SB in display object table 340. If it is "NO" in step S87, it means that coordinates have not been stored in the central column, and function GUIs are displayed on the right side in step S95. For example, the coordinates of search bar SB on the right side are read from display object table 340, and as shown in FIG. 7, search bar SB may be displayed on the right side (at the default position). When the processing of step S95 is terminated, processor 30 can terminate the display object display process. On the other hand, if it is "YES" in step S87, for example, if central coordinates have been stored in display object table 340 such as those of end key EK, processor 30 can display function GUIs at the center of function display region 72 in step S89. For example, as shown in FIG. 6, end key EK is displayed at the center on the lower side in function display region 72. When the processing of step S89 is terminated, processor 30 can terminate the display object display process.

If it is "NO" in step S83, it means that reference position ST is not located on centerline CL, and processor 30 can determine whether or not reference position ST is included in the right region in step S91. If it is "YES" in step S91, it means that reference position ST is included in the right region, and processor 30 can display standard GUIs on the right side in standard GUI display region 74 in step S93, and can display function GUIs on the right side in function display region 72 in step S95. For example, as shown in FIG. 13A, standard GUIs and search bar SB are displayed on the right side in the respective display regions. When the processing of step S95 is terminated, processor 30 can terminate the display object display process.

If it is "NO" in step S91, it means that reference position ST is not included in the right region, and processor 30 can determine whether or not reference position ST is included in the left region in step S97. If it is "YES" in step S97, it means that reference position ST is included in the left region, and processor 30 can display standard GUIs on the left side in standard GUI display region 74 in step S99, and can display function GUIs on the left side in function display region 72 in step S101. For example, as shown in FIG. 13B, standard GUIs and search bar SB are displayed on the left side in the respective display regions. When the processing of step S101 is terminated, processor 30 can terminate the display object display process.

If it is "NO" in step S97, for example, if the position of reference position ST has not been stored in reference position table 338, processor 30 can display standard GUIs and function GUIs at the default positions in step S103, and can terminate the display object display process. For example, the display object is displayed as shown in FIG. 7.

Processor 30 executing the processing of steps S85, S89, S93, S95, S99, and S101 can function as an object display module. Processor 30 executing the processing of step S87 can function as a determination module.

Each of dial pad DP and virtual keyboard KB may be called a first text input region or a second text input region. These text input regions may include a numeric keypad of an electronic calculator, a virtual keypad for directly receiving inputs, a keyboard including 12 keys (which may also be called a 12 keyboard) each having a character indicating the initial character of each row of the Japanese syllabary written thereon, and a start key used when starting text input by voice recognition and the like.

Text to be input in the text input region may include not only numbers, hiragana and katakana, but also kanji (Chinese characters used in Japan), symbols, emoticons, characters utilized in languages other than Japanese (the alphabet, the Hangul, etc.) and the like.

"Position information" contains reference position table 338 and at least one of dial pad data 346 and virtual keyboard data 348 described earlier. For example, in this embodiment, reference position table 338 storing the result of conversion of the display position (reference position ST) of the text input region to the right, left or center is used as position information, and the display object is displayed based on that position information. In another embodiment, the display object may be displayed using reference position ST (coordinates) contained in dial pad data 346 or virtual keyboard data 348 as position information, without using this reference position table. Although processor 30 executing the processing of step S25 or step S65 can function as a memory module in the former embodiment, processor 30 executing the processing of step S23 or step S63 can function as a memory module in the latter embodiment.

The display object is displayed not only on the screen during calling, the telephone function screen and the preview screen, but also on the home screen and other function screens, and is displayed on the right, left or center based on the reference position table.

In accordance with a change in the display of the display object, a region where a touch corresponding to the display object is to be detected (detection region) may be offset to the right or left. For example, if the display object is displayed on the right side in each display region, the display object detection region is offset from the center to the right side. On the other hand, if the display object is displayed on the left side in each display region, the display object detection region is offset from the center to the left side.

In the display object display process shown in FIG. 22, only the display of function GUIs may be changed without changing the display position of standard GUIs, or only the display of standard GUIs may be changed without changing the display position of function GUIs.

The virtual keyboard may include a GUI for, after changing a display position, receiving an operation for returning the display position to the reference position. When the operation on the GUI is received, information on reference position ST stored in changed reference position table 338 is returned to the state corresponding to the reference position.

The display object may include tabs included in the telephone function screen and the like, a slider displayed for a music player function or the like, a cancellation GUI for canceling a locked state (e.g., an object for inputting a pattern), and the like. For example, when a lock screen is displayed in the state where a setting has been made such that the display object is displayed on the right side, the cancellation GUI included in the lock screen is displayed on the right side in function display region 72.

The display object may be changed in size in accordance with the position of the text input region in the longitudinal and horizontal directions. For example, the length of search bar SB may be set to be shorter as the distance between the edge of dial pad DP and the lower edge of function display region 72 approaches. The length of a lateral slider may be set to be shorter as the distance between the edge of dial pad DP and the right (left) edge of function display region 72 approaches.

In another embodiment, dial pad DP and virtual keyboard KB may be associated with each other not only in terms of position, but also in terms of size. In still another embodiment, a setting may be able to be changed such that dial pad DP and virtual keyboard KB may not be associated with each other.

In another embodiment, the display object may be displayed on the right side in each display region also when reference position ST is located on centerline CL.

In another embodiment, a hard key corresponding to standard GUIs may be provided. If the hard key corresponding to standard GUIs is provided, standard GUIs are not displayed.

The program used in this embodiment may be stored in HDD of a data distribution server, and may be distributed to mobile phone 10 over a network. A storage medium, such as an optical disk including CD, DVD and BD (Blu-Ray Disk), a USB memory, and a memory card, having a plurality of programs stored thereon, may be sold or distributed. When a program downloaded through the above-mentioned server, the storage medium or the like is installed in a mobile phone of a configuration equivalent to that of this embodiment, effects equivalent to those of the embodiment are acquired.

All of specific numerical values mentioned in the present specification are mere examples, and can be varied as appropriate depending on changes in product specification and the like.

It should be understood that the embodiments disclosed herein are illustrative and non-restrictive in every respect. The scope of the present disclosure is defined by the claims not by the description above, and is intended to include any modification within the meaning and scope equivalent to the terms of the claims.

The present disclosure has adopted the following configuration as an aspect. The reference characters in parentheses, supplementary explanation and the like indicate correspondence with embodiments which will be described in order to help understanding of the present disclosure, and are not intended to limit the present disclosure in any way.

An aspect of the present disclosure is a mobile terminal having a display module, including a display module configured to display a first text input region, a processor configured to change a display position of the first text input region in accordance with a user's operation, and a memory module configured to store position information indicating a changed display position of the first text input region. The display module is configured to display a display object included in a region other than the first text input region based on the position information.

In an aspect of the present disclosure, the mobile terminal (10: reference character illustrating a corresponding portion in embodiments, which also applies hereinbelow) has a display module (14) also referred to as a display. The display module (30, S3, S43) is configured to display a text input region (DP), including keys for inputting text, for example, in such a manner that the display position can be changed. A user inputs text by operating the keys of the first text input region. The processor (30, S7, S47) is configured to, when a position changing operation is performed on the first text input region, change the display position of the first text input region in accordance with that operation. The display module (30, S85, S89, S93, S95, S99, S101**) is configured to display a display object, such as GUI included in a region other than the first text input region at the right, left or center of the display module based on the stored position information indicating the display position of the first text input region.

According to an aspect of the present disclosure, a display object displayed on another screen can be displayed at an appropriate position by determining with which hand a user performs text input.

Particularly when the display module of large size is provided with a touch panel, it is difficult to perform a touch operation on the whole screen with one hand. According to an aspect of the present disclosure, a display object is appropriately displayed in accordance with the hand with which an operation is performed, and therefore, even a mobile terminal having a display module of large size is easy to be held with one hand.

Preferably, in the mobile terminal, the display module is configured to display a second text input region based on the position information.

In an aspect of the present disclosure, the display module (30, S43, S3) is configured to display the second text input region (KB) of another type different from the first text input region based on the stored position information indicating the display position of the first text input region. For example, when the stored position information is changed to be displayed on the right side in the display module, the second text input region displayed on another screen is also displayed on the right side.

According to an aspect of the present disclosure, by associating the display positions of the two text input regions, convenience when inputting text can be improved.

Preferably, the memory module is configured to, when the display of the display module is switched after the display position of the first text input region is changed, store the position information indicating the changed display position of the first text input region, and the display module is configured to display the display object based on the position information after the display of the display module is switched.

In an aspect of the present disclosure, the memory module is configured to store the position information indicating the changed display position of the first text input region when the display of the display module transitions to another screen after the display of the first text input region is changed, for example. Then, a display object is configured, when another screen is displayed on the display module, to be displayed based on the stored position information.

According to an aspect of the present disclosure, by restraining the display of a display object from being changed until the display is switched, the processing load on the mobile terminal can be reduced.

Preferably, the first text input region is configured to include a reference position to be used as a reference for the display position, the memory module is configured to store the position information indicating the changed reference position of the first text input region, and the display module is configured to display the display object based on the position information indicating the reference position of the first text input region.

In an aspect of the present disclosure, the first text input region is configured to include a reference position (ST) to be used as a reference for the display position. The memory module is configured to store the position information indicating the changed reference position of the text input region. The display object is configured to be displayed based on the position information indicating the stored reference position.

According to an aspect of the present disclosure, it becomes easy for a user to recognize the reference when the first text input region is displayed because of the reference position of the first text input region.

Preferably, the display object is configured to be displayed at a default position when the display position of the first text input region is changed to a specific position.

In an aspect of the present disclosure, in the case where a setting has been made such that the display object is not displayed when the display position of the first text input region is changed to a specific position, for example, the display object is configured to be displayed at a default position of the display module, for example.

According to an aspect of the present disclosure, when the display position of the first text input region is changed to a specific position, the display object is displayed at the default position considered to be easy for a user to operate.

Another aspect of the present disclosure is a display control method including the steps of displaying a text input region (S3, S43), changing a display position of the text input region in accordance with a user's operation (S7, S47), storing position information indicating the changed display position of the text input region (S23, S25, S63, S65), and displaying a display object included in a region other than the text input region based on the position information (S85, S89, S93, S95, S99, S101).

In another aspect of the present disclosure, a display object displayed on another screen can be displayed at an appropriate position by determining with which hand a user performs text input, similarly to the first aspect.

The invention claimed is:

1. A mobile terminal capable of being operated with one hand having a display module, comprising:
   a display configured to display a first text input region, wherein the first text input region comprises at least one of a virtual keyboard and a virtual dial pad;
   a processor configured to change a display position of the first text input region in accordance with a user's operation; and
   a memory configured to store position information indicating the changed display position of the first text input region;
   wherein, based on the position information, the processor is configured to display a display object
      in a first display region of the display when the display position is included in the first display region; and
      in a second display region of the display when the display position is included in the second display region,
   wherein when the display is seen by the user when the user is operating the mobile terminal with one hand, the first display region is located toward a left side of the display with respect to the second display region, and
   wherein the display object is displayed in a region other than the first text input region.

2. The mobile terminal according to claim 1, wherein the display is configured to display a second text input region based on the position information.

3. The mobile terminal according to claim 1, wherein:
   the display is configured to display the display object based on the position information after the display position is changed.

4. The mobile terminal according to claim 1, wherein:
   the first text input region includes a reference position to be used as a reference for the display position,
   the position information stored in the memory indicates a changed reference position of the first text input region when the display position is changed, and
   the display is configured to display the display object based on the changed reference position.

5. The mobile terminal according to claim 1, wherein the display object is configured to be displayed at a default position when the display position of the first text input region is changed to a specific position.

6. A display control method by a processor of a mobile terminal having a display and capable of being operated with one hand, the method comprising:
   displaying a text input region, wherein the text input region comprises at least one of a virtual keyboard and a virtual dial pad;

changing a display position of the text input region in accordance with a user's operation;
storing position information indicating the changed display position of the text input region; and
based on the position information, displaying a display object
  in a first display region of the display when the display position is included in the first display region; and
  in a second display region of the display when the display position is included in the second display region,
wherein when the display is seen by the user when the user is operating the mobile terminal with one hand, the first display region is located toward a left side of the display with respect to the second display region, and
wherein the display object is displayed in a region other than the first text input region.

\* \* \* \* \*

UNITED STATES PATENT AND TRADEMARK OFFICE
CERTIFICATE OF CORRECTION

PATENT NO. : 9,703,418 B2
APPLICATION NO. : 14/945251
DATED : July 11, 2017
INVENTOR(S) : Tomohiro Shimazu and Kimiko Hirayama It is certified that error appears in the above-identified patent and that said Letters Patent is hereby corrected as shown below:

In the Claims

Claim 1, Column 20, Line 20, delete "having a display module"

Signed and Sealed this
Twenty-seventh Day of March, 2018

Andrei Iancu
*Director of the United States Patent and Trademark Office*